(12) United States Patent
Bennett

(10) Patent No.: US 11,242,137 B2
(45) Date of Patent: Feb. 8, 2022

(54) LOCK AND AIRCRAFT LANDING GEAR ASSEMBLY

(71) Applicant: SAFRAN LANDING SYSTEMS UK LTD, Gloucester (GB)

(72) Inventor: Ian Robert Bennett, Gloucester (GB)

(73) Assignee: Safran Landing Systems UK LTD

( * ) Notice: Subject to any disclaimer, the term of this patent is extended or adjusted under 35 U.S.C. 154(b) by 255 days.

(21) Appl. No.: 16/691,985

(22) Filed: Nov. 22, 2019

(65) Prior Publication Data

US 2020/0086980 A1   Mar. 19, 2020

Related U.S. Application Data

(63) Continuation of application No. 14/916,867, filed as application No. PCT/GB2014/052624 on Aug. 29, 2014.

(30) Foreign Application Priority Data

Sep. 10, 2013 (GB) ..................................... 1316101

(51) Int. Cl.
*B64C 25/26* (2006.01)
*F16H 27/06* (2006.01)
(Continued)

(52) U.S. Cl.
CPC .............. *B64C 25/26* (2013.01); *B64C 25/20* (2013.01); *F16H 25/18* (2013.01); *F16H 27/06* (2013.01); *E05D 11/1007* (2013.01); *E05D 11/1057* (2013.01); *E05D 11/1071* (2013.01); *E05Y 2900/50* (2013.01)

(58) Field of Classification Search
CPC . E05D 11/10; E05D 11/1007; E05D 11/1014; E05B 85/20; E05B 85/24; E05B 85/26; E05B 85/28; Y10T 292/17; Y10T 292/1046; Y10T 292/1056; Y10T 292/1057; Y10T 292/1066; Y10T 292/1068; Y10T 292/1069; Y10T 292/1077; Y10T 292/96; E05C 3/004; E05C 3/06; E05C 3/08; E05C 3/10; E05C 3/162; E05C 3/165; E05C 3/167;
(Continued)

(56) References Cited

U.S. PATENT DOCUMENTS 2,423,501 A   7/1947   Johnson
2,444,319 A   6/1948   Winter
(Continued)

FOREIGN PATENT DOCUMENTS

CA   2752966 A1   3/2012
CN   201745745 U   2/2011
(Continued)

OTHER PUBLICATIONS

International Search Report for International Application No. PCT/GB2014052624 dated Jan. 28, 2015, 6 pages.
(Continued)

*Primary Examiner* — Philip J Bonzell
(74) *Attorney, Agent, or Firm* — RatnerPrestia

(57) ABSTRACT

A mechanical lock for a vehicle assembly such as an aircraft landing gear assembly. The lock is either pivotally mounted and substantially mass balanced, or part of an aircraft landing gear assembly and arranged to be mechanically operated from the ground by a mechanical actuation device.

13 Claims, 5 Drawing Sheets

(51) Int. Cl.
*B64C 25/20* (2006.01)
*F16H 25/18* (2006.01)
*E05D 11/10* (2006.01)

(58) Field of Classification Search
CPC ... E05C 3/24; E05C 3/36; B64C 25/26; B64C 25/20
See application file for complete search history.

(56) References Cited

U.S. PATENT DOCUMENTS

| | | | |
|---|---|---|---|
| 2,497,415 | A | 2/1950 | Parker |
| 2,511,528 | A | 6/1950 | Clark et al. |
| 2,692,784 | A | 10/1954 | McRae |
| 2,772,060 | A | 11/1956 | Bendicsen |
| 3,107,886 | A | 10/1963 | Bossier |
| 5,022,609 | A | 6/1991 | Cranston |
| 5,308,023 | A | 5/1994 | Kress |
| 5,333,816 | A | 8/1994 | Del Monte |
| 6,131,852 | A | 10/2000 | Holloway |
| 8,820,340 | B2 | 9/2014 | Hughes |
| 2006/0163426 | A1 | 7/2006 | Smith, III |
| 2009/0057485 | A1 | 3/2009 | Seror-Goguet et al. |
| 2009/0071207 | A1 | 3/2009 | Meyer et al. |
| 2009/0250552 | A1 | 10/2009 | Kearns et al. |
| 2012/0017961 | A1 | 1/2012 | Hughes |
| 2012/0037752 | A1 | 2/2012 | Collins |
| 2012/0080559 | A1 | 4/2012 | Keller et al. |
| 2013/0119197 | A1 | 5/2013 | Ducos |
| 2013/0146704 | A1 | 6/2013 | Menezes et al. |

FOREIGN PATENT DOCUMENTS

| | | |
|---|---|---|
| EP | 0265197 A2 | 4/1988 |
| EP | 2433865 A2 | 2/2010 |
| EP | 2391785 B1 | 8/2016 |
| GB | 470928 | 8/1937 |
| GB | 473425 | 10/1937 |
| GB | 514051 | 10/1939 |
| GB | 537464 | 6/1941 |
| GB | 592591 | 9/1947 |
| GB | 606079 | 8/1948 |
| GB | 620037 | 3/1949 |
| GB | 626280 | 7/1949 |
| GB | 627322 | 8/1949 |
| GB | 644147 | 10/1950 |
| GB | 648362 | 1/1951 |
| GB | 704080 | 2/1954 |
| GB | 993847 | 6/1965 |
| GB | 1175097 | 12/1969 |
| GB | 1295710 | 11/1972 |
| GB | 1327384 | 8/1973 |
| GB | 1445947 | 8/1976 |
| GB | 1500003 | 2/1978 |
| GB | 1520764 | 8/1978 |
| GB | 2467385 A | 8/2010 |
| GB | 2480623 A | 11/2011 |
| JP | 2007230352 A1 | 9/2007 |
| WO | 2005005252 A1 | 1/2005 |
| WO | 2006081664 A1 | 8/2006 |
| WO | 11144629 A2 | 11/2011 |

OTHER PUBLICATIONS

Written Opinion of the International Searching Authority for International Application No. PCT/GB2014/052624, dated Jan. 28, 2015, 8 pages.
Great Britain Search and Examination Report for Great Britain Application No. GB1316101.3, dated Mar. 26, 2014, 4 pages.
Great Britain Search Report for Great Britain Application No. GB1501925, dated Jul. 1, 2015, 1 page.
Great Britain Examination Report for Great Britain Application No. GB1316101.3, dated May 5, 2015, 2 pages.
Great Britain Examination Report for Great Britain Application No. 1501842.7, dated Jul. 6, 2015, 3 pages.
Great Britain Further Search Report for Great Britain Application No. GB1316101.3, dated Dec. 17, 2014, 1 page.
Great Britain Further Seach Report for Great Britain Application No. GB1316101.3, dated Dec. 17, 2014, 1 page.
Response to Combined Search and Examination Report dated Mar. 3, 2015 for GB Application No. 1316101.3, 3 pages.
Response to Combined Search and Examination Report dated Aug. 19, 2015 for GB Application No. 1501925.1, 1 page.
Response to Combined Sedarh an Examinatin Report dated Nov. 5, 2015 for GB Application No. 1501842.7, 3 pages.
Extended European Search Report for European Application No. 19182478.8, dated Sep. 23, 2019, 10 pages.
Extended European Search Report for European Application No. 191824770.0, dated Nov. 15, 2019, 10 pages.
Entire patent prosecution history of U.S. Appl. No. 14/916,867, filed Mar. 4, 2016, entitled, "A Lock and Aircraft Landing Gear Assembly (as Amended)."
European Communication for European Application No. 19 182 478.8, dated Aug. 28, 2020, 5 pages.

LOCK AND AIRCRAFT LANDING GEAR ASSEMBLY

This application is a continuation of U.S. application Ser. No. 14/916,867, filed Mar. 4, 2016, which priority to International Application No. PCT/GB2014/052624, filed Aug. 29, 2014, which claims the benefit of United Kingdom Application No. GB 1316101.3, filed Sep. 10, 2013, all of which are incorporated herein by reference.

BACKGROUND

It is known for a vehicle assembly to include a lock arranged to maintain a first part of the assembly in a particular position with respect to a second part of the assembly.

An example of such a vehicle assembly is an aircraft landing gear assembly, which may include a down lock and a ground lock.

The purpose of a down lock is to lock a landing gear assembly in a deployed condition. An actuator may be provided to unlock the down lock, thereby enabling the landing gear assembly to move to a stowed condition. Accidental actuation of the down lock actuator when the aircraft is on the ground can result in the aircraft fuselage striking the ground.

As such, it is common to provide a ground lock to inhibit unlocking of the down lock while the ground lock is in a locked condition. A ground lock is generally a simple mechanical lock. In one example, the arms of a lock link are each provided with a hole, the holes being located so as to become coaxially aligned when the landing gear is in a deployed condition. A pin is manually inserted into the holes to inhibit articulation of the lock link, thereby inhibiting retraction of the landing gear. Prior to take off, a user may remove the pin such that the landing gear can be stowed following takeoff.

Ground lock accessibility is therefore a consideration at the design stage of a landing gear assembly. The present inventor has identified that this can result in a landing gear assembly receiving a sub optimal geometry.

Known vehicle assembly locks can also be adversely affected by movement of the vehicle assembly in use. To address this problem, it is known to provide a substantial biasing device, such as a spring, to maintain the lock in a particular condition while the vehicle assembly is moving.

However, the present inventor has identified that the size and/or mass of such biasing devices can be reduced, and in some cases eliminated.

SUMMARY

According to a first aspect of the invention, there is provided a lock for a vehicle assembly,
the lock comprising:
a movably mounted first part including a first engagement surface which defines a swept volume as the first part moves;
a second part mounted via one or more bearing surfaces so as to be rotatable about a pivot axis and including a second engagement surface, the second part being pivotally movable between:
a locked condition, in which the second engagement surface is within a locking region of the swept volume for engagement with the first engagement surface to inhibit movement of the first part; and
an unlocked condition, in which the second engagement surface is outside of the locking region of the swept volume,
wherein the one or more bearing surfaces define an effective bearing radius which is greater than the distance between the centre of mass of the second part and the pivot axis.

Thus, the lock according to the first aspect may in embodiments of the invention be less likely to pivotally move due to forces arising from movement of the vehicle assembly, in comparison to prior art locks. As such, the likelihood of the lock unintentionally changing between the locked and unlocked condition may be reduced.

In embodiments of the invention, the second part bearing friction moment may substantially resist movement due to inertia moment. For example, the coefficient of friction may be within the range 0.05 to 0.45, in some embodiments within the range of 0.1 to 0.25 and in some embodiments within the range of 0.15 to 0.2.

The distance between the centre of mass of the second part and the pivot axis will be referred to as the "Cg offset". The Cg offset is preferably less than 50% of the effective bearing radius, more preferably less than 45%, even more preferably less than 25%, even more preferably less than 10% and even more preferably less than 5%.

The entire swept volume may define the locking region of the swept volume.

The lock may be arranged such that, with the second part in the unlocked condition the second engagement surface is outside of the swept volume.

The lock may include a biasing device arranged to bias the second part to remain in one or more of the locked condition and the unlocked condition. Advantageously, the biasing force required may be reduced relative to known arrangements due to the second part being substantially mass balanced about the pivot axis.

The biasing device may comprise a sprung detent arranged to hold the second part in a locked or unlocked position once it is in that position.

The lock geometry may inhibit the lock engaging when the first part is out of the lockable position, for example when the gear is retracted or in transit, but when the gear is in a down position the lock may be engaged or disengaged at will. The detent(s) may hold the second part in either or both positions, since when on the ground it is sometimes preferred that the lock does not accidentally engage, and at other times that it does not accidentally disengage.

The second part may define a generally circular major peripheral surface portion which extends around the pivot axis of the second part and which defines the second engagement surface.

The first part may include a recessed surface which defines the first engagement surface. Such embodiments of the invention are advantageous in comparison to a pawl 'finger style' lock in that the locking elements, which can extend along a major portion of a shaft, react shear and bending loads.

The second part may include a recessed surface which defines a passageway for movement of the first part when the second part is in the unlocked condition.

The recessed surface of the first and/or second part may have an arc shaped cross section through a plane which is orthogonal with respect to the pivot axis.

The radius of a peripheral surface portion of the first part may correspond or generally equate to the radius of the recessed surface of the second part. This may minimise the amount of unbalance provided by the recess.

The radius of a peripheral surface portion of the second part may correspond or generally equate to the radius of the recessed surface of the first part.

The first and/or second engagement surface may include a ramped or stepped region. This may permit the lock to partially engage when the first part is slightly out of the engagement position for locking.

In accordance with a second aspect of the invention, there is provided a vehicle assembly including a lock according to the first aspect.

The vehicle assembly may comprise an aircraft landing gear assembly.

The lock may comprise a ground lock mechanically coupled to the landing gear assembly, the assembly including an actuation device arranged for mechanical operation by a user from an operating location on the ground.

The vehicle assembly may include an indicator element arranged to provide a visible indication that the ground lock is in the locked condition. The indication may be visible to the user from the operating location.

In accordance with a third aspect of the present invention there is provided a vehicle assembly comprising:
 a pivotally mounted first part including a first engagement surface which defines a swept volume as the first part moves;
 a pivotally mounted second part including a second engagement surface, the second part being movable between:
  a locked condition, in which the second engagement surface is within a locking region of the swept volume for engagement with the first engagement surface to inhibit movement of the first part; and
  an unlocked condition, in which the second engagement surface is outside of the locking region of the swept volume; and
 a lug,
the second part being configured to be inserted through and mounted within the lug.

Thus, the second part i.e. locking element has a size and proportion for enabling insertion through a lug hole in a member of the vehicle assembly, rather than requiring a separate pivot pin. In embodiments of the invention this results in the second part defining a relatively large bearing in comparison to the pawl of FIG. 1, resulting in relatively high friction to resist movement in use.

The second part, or a lock subassembly of which it forms a part, may be substantially mass balanced about the pivot axis of the second part.

Optional features of the first and second aspects apply equally to the third aspect, mutatis mutandis.

In accordance with a fourth aspect of the present invention, there is provided an aircraft landing gear assembly movable between a deployed condition, in which the landing gear assembly is arranged to support an aircraft on the ground, and a retracted condition for flight, the landing gear assembly including a ground lock comprising:
 a movably mounted first part defining a first engagement surface which defines a swept volume as the first part moves; and
 a movably mounted second part defining a second engagement surface, the second part being movable between:
  a locked condition, in which the second engagement surface is within a locking region of the swept volume for engagement with the first engagement surface to inhibit movement of the first part; and
  an unlocked condition, in which the second engagement surface is outside of the locking region of the swept volume,
the ground lock including an actuation device arranged to enable mechanical operation of the ground lock by a user from a location on the ground when the landing gear assembly is in the deployed condition.

Thus, the landing gear assembly according to the second aspect enables the ground lock to be optimally positioned yet also enables it to be operated from the ground, such as at an operating position adjacent the landing gear assembly, meaning that a user need not use a ladder or the like to operate the ground lock. The provision of a mechanical actuation device may enable simple mechanical operation of the ground lock. The mechanical nature of the ground lock reduces the likelihood of an electrical or hydraulic fault leading to unlocking of the ground lock.

The actuation device may include a mechanical input device arranged to be within the reach of an average human stood at an operating location on the ground when the landing gear assembly is in the deployed condition, the input device being mechanically coupled to the second part via the actuation device. The operating location may be a location adjacent to a wheel of the landing gear assembly.

The landing gear assembly may include a biasing device arranged to bias the actuation device to an unlocked condition corresponding to the second part being in the unlocked condition, and further including a lock element arranged to be engagable with the landing gear assembly to maintain the actuation device in a locked condition corresponding to the second part being in the locked condition.

The landing gear assembly may include an indicator element. The indicator element may comprise an indicator part arranged to move with the second part, the indicator part including an indicator portion that is a different colour than another portion of the indicator part, the indicator part being configured such that the indicator portion overlaps another part of the ground lock when the ground lock is in a first one of the locked or unlocked conditions, and the indicator portion is relatively exposed when the ground lock is in the other one of the locked or unlocked conditions such that a user on the ground can determine the state of the ground lock in accordance with whether the indicator portion is visible. The indicator portion may, for example, be coloured red.

The indicator element may be coupled to the second part substantially outside of the load path between the actuation device and the second part.

The second part may be mounted so as to be rotatable about a pivot axis, the second part being arranged so as to be substantially mass balanced about the pivot axis.

The landing gear assembly may be arranged such that with the second part in the unlocked condition the second engagement surface is outside of the swept volume.

The landing gear assembly may include a position biasing device arranged to bias the second part to remain in one or both of the locked condition and the unlocked condition.

The second part may define a generally circular peripheral surface which extends around the pivot axis of the second part and which defines the second engagement surface.

The first part may include a recessed surface which defines the first engagement surface.

The second part may include a recessed surface which defines a passageway for movement of the first part when the second part is in the unlocked condition.

The recessed surface of the first part and/or second part may be generally arc shaped relative to the pivot axis.

The radius of a peripheral surface portion of the first part may correspond to the radius of the recessed surface of the second part and/or the radius of a peripheral surface portion of the second part may correspond to the radius of the recessed surface of the first part.

The first and/or second engagement surface may include a ramped or stepped region opening onto the peripheral surface thereof.

BRIEF DESCRIPTION OF THE DRAWINGS

Embodiments of the invention will now be described with reference to the accompanying drawings, in which.

DETAILED DESCRIPTION

Figure 1:
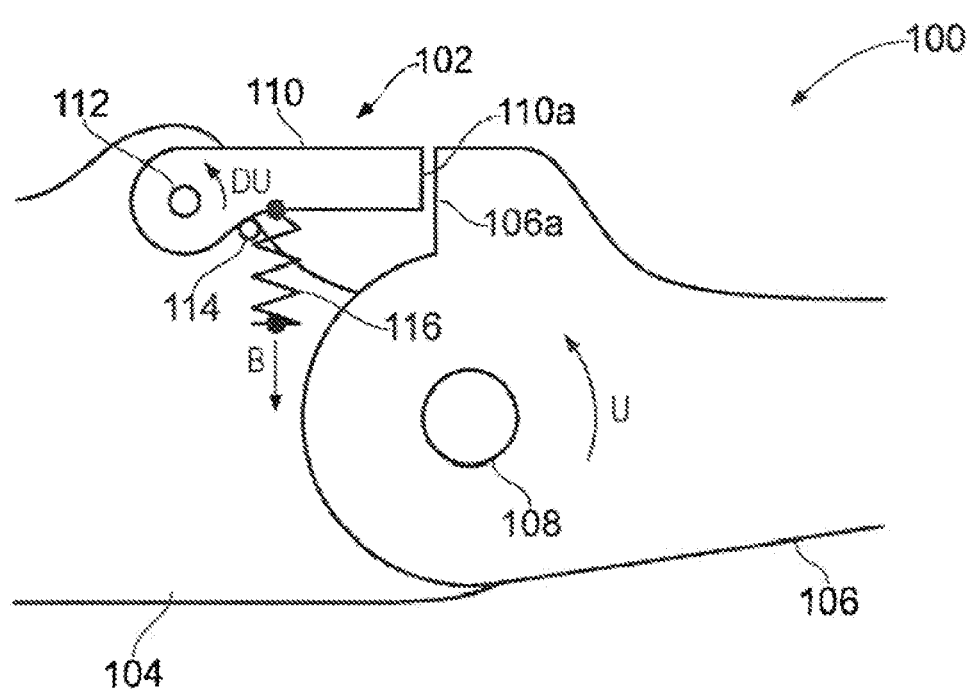
FIG. 1 is a schematic diagram of a known landing gear assembly.

FIG. 1 is schematic diagram of a known landing gear assembly 100 including a down lock 102. The assembly 100 includes a first stay arm 104 pivotally coupled to a second stay arm 106 via a pivot pin 108. The stay arms 104, 106 are shown in a locked condition equating to the landing gear assembly being in a deployed condition for take off and landing.

The down lock 102 is formed by a pawl 110 pivotally coupled to the first stay arm 104 via a pivot pin 112 and biased towards a stop protrusion 114 by a spring 116 acting in tension to apply a biasing force B. When the pawl 110 is held against the stop protrusion 114, the pawl 110 is in a locked condition because an end face 110a adjacently opposes a corresponding shoulder face 106a of the second stay arm 106 such that attempted movement of the second stay arm 106 relative to the first stay arm 104 about pivot 108 in the direction of arrow U is axially reacted by the pawl 110.

The pawl 110 can be moved by an actuator (not shown) in the direction of arrow DU to unlock the down lock 102 such that the stay arms 104, 106 can move to an unlocked condition corresponding to the landing gear assembly 102 being in a stowed condition for flight.

In use, parts of the assembly 100 experience forces, such as centrifugal forces or acceleration or deceleration forces, urging them to move. The pawl 102 for example may attempt to move in the direction of arrow DU against the action of the spring 116. The spring 116 should therefore be appropriately sized to resist such movement because otherwise the down lock 102 may unintentionally unlock. However, increasing the size of a spring generally results in an increase in weight.

Figure 2A:
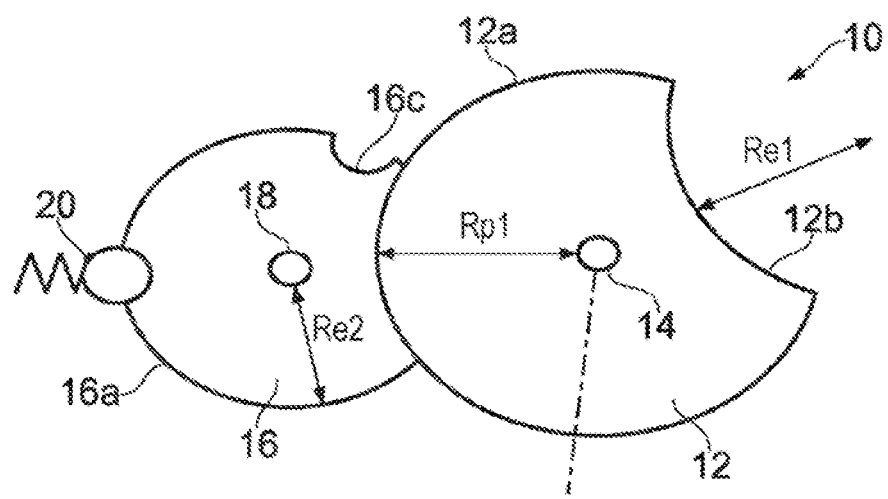
FIGS. 2a and 2b are schematic diagrams of a lock according to an embodiment of the invention.
Figure 2B:
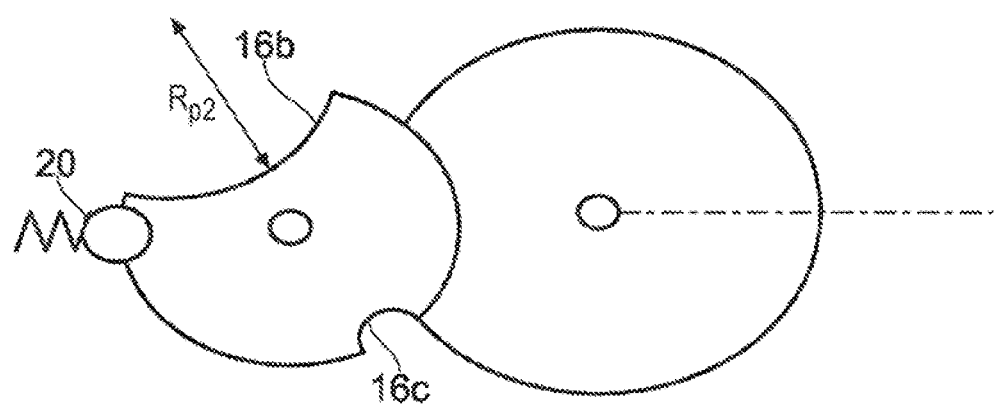

FIGS. 2a and 2b schematically illustrate a lock 10 according to an embodiment of the present invention. The lock 10 is suitable for locking a vehicle assembly in a particular condition.

The lock 10 includes a first part 12, which may for example be coupled to, or may be a part of, a stay arm, link or brace member. The first part 12 is arranged to pivot about a pivot axis 14 as the vehicle assembly changes between first and second conditions; for example, in the case of a landing gear assembly, a deployed condition, in which the landing gear assembly is arranged to support an aircraft on the ground, and a retracted condition for flight.

The first part 12 has a generally circular peripheral surface 12a surrounding the pivot axis 14. Thus, the first part 12 has a generally circular cross section through a plane perpendicular to the pivot axis 14. The peripheral surface 12a includes a concave, arc-shaped first engagement surface 12b, which defines a segment-shaped recess. Rotation of the first part 12 about the pivot axis 14 causes the first engagement surface 12b to move through a swept volume.

The lock 10 includes a second part 16 which is pivotally mounted to rotate about a pivot axis 18. The second part 16 is rotatable by an actuation device (not shown) such as an actuator or cable arrangement; in some embodiments the second part may be arranged to be manually moved by a user.

The second part 16 has a generally circular peripheral surface 16a surrounding the pivot axis 18. Thus, the second part 16 has a generally circular cross section through a plane perpendicular to the axis of the pivot axis 18. In embodiments of the invention this may advantageously enable the second part 16 to be formed by a pivot pin or the like.

The peripheral surface 16a defines a second engagement surface having a radius Re2 that is generally equal to the radius Re1 of the first engagement surface 12b such that the first engagement surface 12b can matingly receive the circular peripheral surface 16a of the second part 16.

The peripheral surface 16a includes a concave, arc shaped passage surface 16b, which defines a segment-shaped recess. The passage surface 16b has a radius Rp2 that is generally equal to the radius Rp1 of the peripheral surface 12a of the first part 12 such that the passage surface 16b can receive the peripheral surface 12a of the first part 12 to permit rotation of the first part 12 about the pivot axis 14.

The second part 16 is rotatable about the pivot axis 18 between an unlocked condition and a locked condition.

In the unlocked condition, as shown in FIG. 2a, the second part 16 is orientated with the passage surface 16b facing the first part 12 with the centre point of the passage surface 16b intersecting a plane which intersects the pivot axes 14, 18. In this condition the second part 16 does not spatially overlap the swept volume of the first part 12. Thus, when in the unlocked condition, the second part 16 permits rotation of the first part 12.

In the locked condition, as shown in FIG. 2b, the generally circular peripheral surface 16a enters the segment-shaped recess defining the first engagement surface 12b so as to be within a locking portion of the swept volume of the first part 12a. Thus, when in the locked condition, the peripheral surface 16a of the second part 16 engages the arc shaped first engagement surface 12b to inhibit rotation of the first part 12.

The second part may assume the locked condition when the first part 12 is in an engagement condition in which the segment-shaped recess which defines the first engagement surface 12b is facing the second part with the centre point of the first engagement surface 12b intersecting the plane which intersects the pivot axes 14, 18. In embodiments of the invention the engagement condition may equate to a landing gear assembly being in a deployed condition.

In embodiments of the invention, the first and/or second engagement surface may include a ramped or stepped region; for example, a region defining a surface that is closer to the pivot axis than an adjacent part of the engagement surface. This may permit the lock to partially engage when the first part is slightly out of the engagement condition for locking.

A position biasing device 20 in the form of a spring loaded detent is provided to bias the second part 16 to remain in the locked and unlocked conditions. The second part includes two positioning recesses 16c each arranged to receive the spring loaded detent 20. One of the positioning recesses 16c is arranged to receive the spring loaded detent 20 upon the second part being orientated in the locked condition. The other one of the positioning recesses 16c is arranged to receive the spring loaded detent 20 upon the second part being orientated in the unlocked condition. The actuation device may be used to provide a dominant force relative to the biasing force provided by the position biasing device 20.

In the illustrated embodiment the second part 16 has a generally circular cross section perpendicular to its axis of rotation. Imbalance caused by the segment-shaped recess which defines the passage surface 16b and by the positioning recesses 16c is relatively minor relative to the effective bearing radius and may in some embodiments of the invention be counter-balanced. The lock is arranged such that the friction moment of the second part substantially resists movement due to inertia moment. Any shortfall may be addressed by the detent biasing force.

Figure 3:
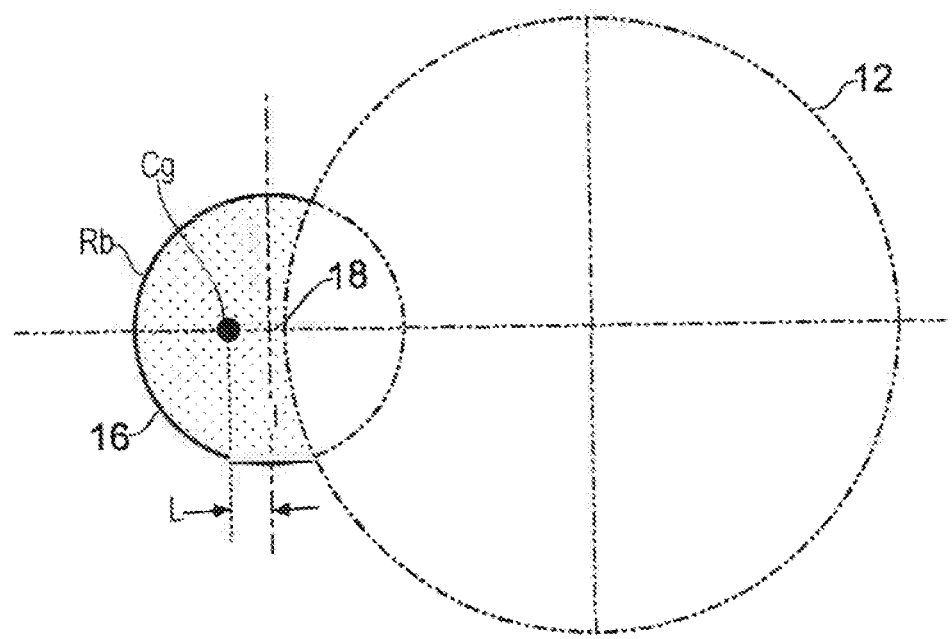
FIG. 3 is a schematic diagram illustrating the centre of mass, bearing radius and centre of rotation of the second part.
Figure 4:
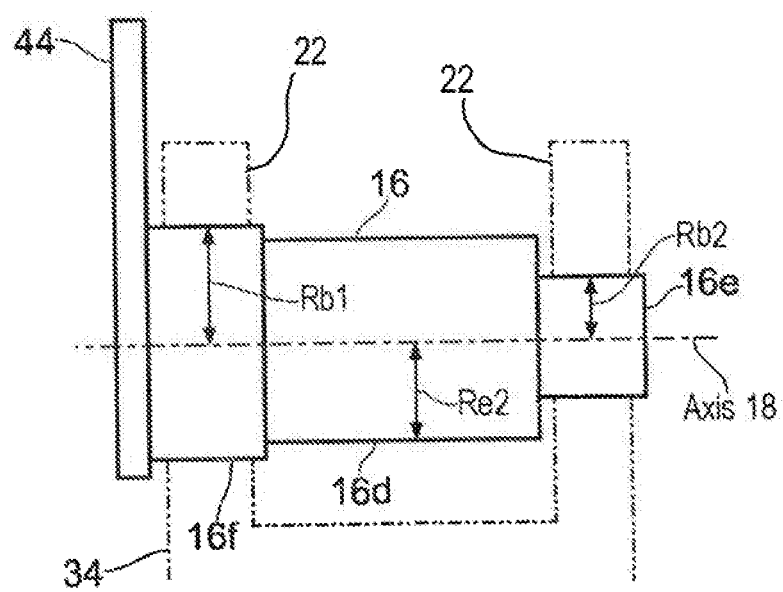
FIG. 4 is a schematic diagram illustrating bearing portions of the second part which are of different radii with respect to the locking portion of the second part.

Referring additionally to FIGS. 3 and 4, the second part includes bearing portions 16f, 16e defining respective bearing surfaces which support the second part 16 within the lugs 22 of the stay arm 34. A locking portion 16d is disposed between them. The locking portion 16d defines the second engagement surface and the passage surface. The bearing portions 16f, 16e differ in diameter with respect to the locking portion 16d. For example, the locking portion 16d has radius Re2. The bearing portions 16e, 16f have radii Rb1 and Rb2 respectively. In the illustrated embodiment Rb2 is smaller than Re2 and Rb1 is larger than Re2. The second part 16 can be retained in its axial position relative to the stay arm 34 by a number of means familiar to a person skilled in the art; for example, by a nut on the outer end of the second bearing portion 16e (not shown). In another embodiment Rb1 and Rb2 can be the same as Re2, in which case the stay arm 34 would have a single continuous bearing bore to receive Re2, this giving support along the majority of the length of element 16.

If the radii Rb1 and Rb2 are equal then this is the effective radius to consider for friction. If the centre of mass Cg of the second part 16 is mid-way between the bearing portions 16a, 16f then the effective radius will be the arithmetic mean between Rb1 and Rb2. If the centre of mass Cg is closer to the first bearing portion 16f, for example, then proportionally greater 'weighting' should be given to the radius Rb1 when determining the effective mean radius. The effective bearing radius may be defined as =[(% weight borne on 16f×Rb1)+(% weight borne on 16e×Rb2)]/100.

The inertia moment of the second part 16 can be calculated from its mass×acceleration×offset L of the centre of mass axis Cg from the pivot axis 18. The offset L of the centre of mass axis Cg from the pivot axis 18 will be referred to as the "Cg offset". Thus, inertia moment=M·a·L. The general cross sectional area of the second part 16 is similar in size to its effective bearing radius. As such, even with a substantial segment-shaped recess defined by the passage surface 16b (illustrated in FIGS. 2a and 2b), the centre of mass Cg of the second part 16 is relatively close to the pivot axis 18 in comparison to the effective bearing radius.

The friction moment of the second part can be calculated by radial force×coefficient of friction×second part effective mean rotational bearing radius Rb. Thus, friction moment=F·μ·R, where F is given by mass×acceleration=M·a.

Therefore, the second part 16 will remain still without a detent if M·a·μ·R≥M·a·L, which may be simplified to μ·R≥L. Put another way, the orientation of the second part 16 will generally be unaffected by forces arising from vehicle movement if the Cg offset L is no greater than the second part mean rotational bearing radius multiplied by its mean bearing coefficient of friction. Generally speaking, an increase in mass balance of the second part 16, results in a decrease in terms of bearing friction and/or detent biasing force required to inhibit rotational movement of the second part 16 due to forces arising from movement of the vehicle.

Thus, a lock according to embodiments of the invention may be less likely to rotate due to vehicle movement in comparison to prior art locks. As such, the likelihood of the lock unintentionally changing between the locked and unlocked condition may be reduced. If a biasing device is provided to bias the second part to a particular orientation, the biasing force required may be reduced relative to known arrangements.

A lock according to embodiments of the invention may take any suitable form and may be used with any suitable vehicle assembly to lock the position of a first part of the assembly relative to a further part of the assembly; for example, a landing gear uplock latch, a door lock, or on a piece of equipment arranged to rotate in use.

In embodiments where the second part has a generally circular profile, the second part may advantageously be mounted within a lug or the like, rather than requiring a separate pivot pin.

Figure 5A:
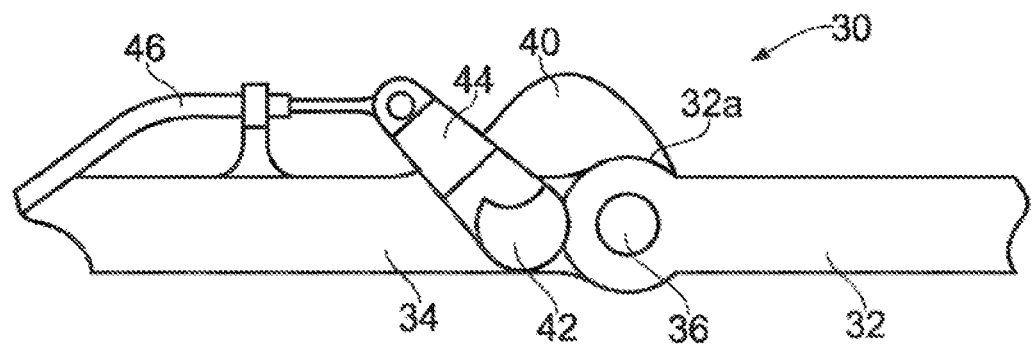
FIGS. 5a to 5c are schematic diagrams of part of a aircraft landing gear assembly according to an embodiment of the invention.
Figure 5B:
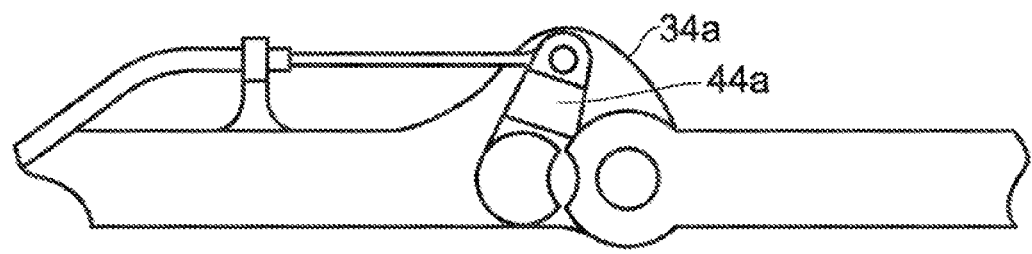
Figure 5C:
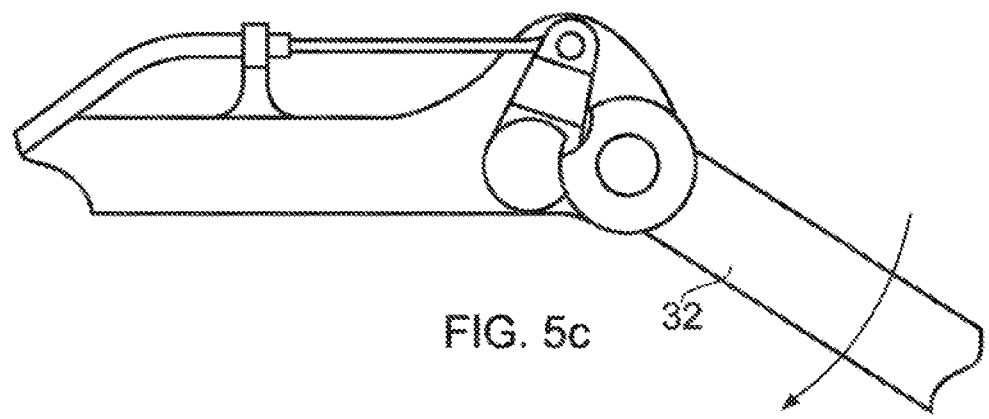

FIGS. 5a to 5c show an aircraft landing gear assembly 30 according to an embodiment of the present invention.

The landing gear assembly 30 includes a foldable stay having a first stay arm 32 and a second stay arm 34 pivotally connected via a pivot pin 36. The stay arms move pivotally with respect to one another as the landing gear assembly moves between a deployed condition, in which the landing gear assembly 30 is arranged to support an aircraft on the ground, and a retracted condition for flight. In the deployed condition, the stay arms 32, 34 are generally longitudinally aligned to define a generally straight stay, as illustrated in FIG. 5a. As the landing gear assembly moves towards the stowed condition, the stay arms 32, 34 become misaligned, as illustrated in FIG. 5c.

The landing gear assembly 30 includes a ground lock 40. The ground lock 40 in the illustrated embodiment is similar to the lock 10 described with reference to FIGS. 2a and 2b; as such, for brevity, only a brief description will be provided.

The ground lock 40 includes a first part 32a, defined by the end of the first stay arm 32 which is closest to the pivot pin 36, and a second part 42 which is pivotally coupled to the second stay arm 34 close to the pivot pin 36.

Figure 6:
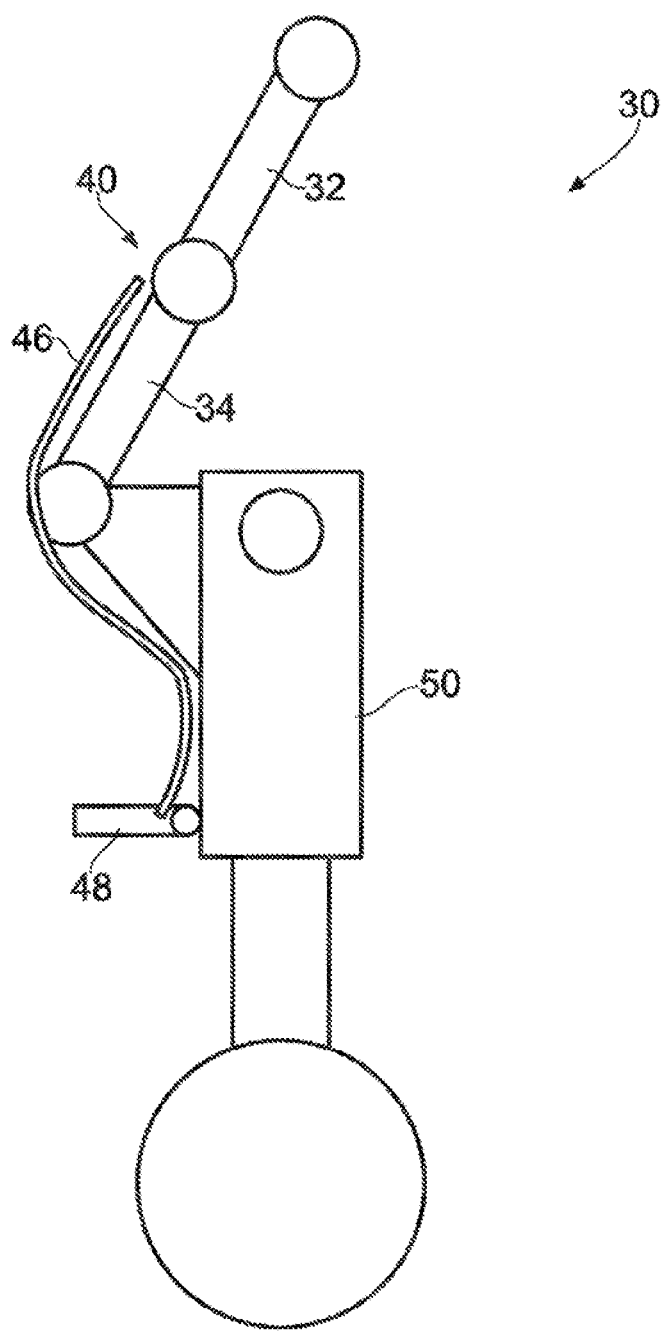
FIG. 6 is a schematic diagram of the landing gear assembly of FIGS. 5a to 5c.

Referring additionally to FIG. 6, an actuation device 46 is operable to rotate the second part 42 to enable mechanical operation of the ground lock 40 by a user from an adjacent location on the ground. In the illustrated embodiment the actuation device is a Bowden cable, but in other embodiments may take any suitable form. The second part 42 may be coupled to a lever arm 44 that is attached to an actuation device 46 such that the load path of an applied turning force acts through the lever arm 44 to provide mechanical advantage to the actuation device 46.

The actuation device 46 is operable to move the second part 42 between a locked condition, in which the second part 42 engages the first part to inhibit movement of the landing gear assembly 30 from the deployed condition to the retracted condition, and a non-locking condition, in which the second part 42 permits movement of the landing gear assembly from the deployed condition to the retracted condition due to the second part 42 not residing within the swept volume of the first part 32a.

The actuation device 46 includes a mechanical input device 48, which in the illustrated embodiment is a handle pivotally coupled to a main fitting 50 and arranged to drive the Bowden cable. The mechanical input device 48 is arranged to be within the reach of an average human stood at an operating location on the ground when the landing gear assembly is in the deployed condition. As such, the ground lock 40 can be operated using the input device 48. The operating location may be adjacent to a lower portion of the landing gear assembly, for example, a wheel.

In embodiments of the invention the landing gear assembly 30 may include a biasing device (not shown) arranged to bias the actuation device 46 to a unlocked condition corresponding to the second part being in the unlocked condition; for example, a spring may be provided to force the mechanical input device to an unlocked condition. In such embodiments, a removable lock element (not shown) may be provided that is arranged to be engagable with the landing gear assembly to maintain the actuation device 46 in a locked condition corresponding to the second part being in the locked condition. Thus, the pilot can feel assured that the ground lock is disengaged by viewing the removed lock element.

The ground lock 40 includes an indicator element 44a which in the illustrated embodiment is a coloured portion of the lever arm 44; the colour may for example be red. The indicator element 44a is arranged to move with the second part 42 so as to be visible to a user of the actuation device 46 when the ground lock 40 is in the locked condition in order to provide a visible indication that the ground lock 40 is engaged. The indicator element 44a is arranged to be hidden from the user of the actuation device 46 when the ground lock 40 is in the unlocked condition in order to provide a visible indication that the ground lock 40 is disengaged; for example, in the illustrated embodiment the indicator element 44a is hidden behind a cover portion 34a of the second stay arm 34.

In use, when it is desired to engage the ground lock 40, a user operates the actuation device 46 to pivotally move the lever arm 44 from an unlocked position as shown in FIGS. 3b and 3c, to a locked position as shown in FIG. 3a. The movement of the lever arm 44 causes corresponding rotation of the second part 42 to move it from the unlocked condition to the locked condition. When in the locked condition, the indicator element is exposed so as to be visible to the user such that the user can verify that the ground lock 40 is engaged.

Thus, the landing gear assembly according to embodiments of the invention provides a simple means by which a user stood on the ground can mechanically operate a ground lock which is situated out of the manual reach of the user.

While the ground lock 40 in the illustrated embodiment is similar to the lock 10 of FIGS. 2a to 2c, in other embodiments the ground lock may take any suitable form in which ground lock is mechanically coupled to the landing gear assembly and to a mechanical actuation device for mechanical operation by a user from an operating location on the ground; for example, the first part may comprise a lock link arm with a hole through it and the second part may comprise a bolt or pin movably mounted on the landing gear and movable into an out of the hole by the actuation device, the landing gear bearing arranged such that the holes of both lock link arms are coaxially aligned when the landing gear is in a deployed condition. In other embodiments, the actuation device may be coupled to a pawl operating in a similar manner to pawl 110 in FIG. 1, with or without a biasing force B.

In embodiments of the invention the first and/or second part may be formed of any suitable material, such as metal, a hard plastics material, or a composite material; steel or titanium are preferred materials.

Advantageously, the lock according to embodiments of the invention does not attempt to engage and jam the gear when retracted or in transit in the air; for example, the generally circular arrangement acts as a means of baulking the ground lock when the gear is not in the downlocked position.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

Before setting out the claims, we will first present a set of clauses defining embodiments of the invention.

Clause 1. A lock for a vehicle assembly, the lock comprising:
  a movably mounted first part including a first engagement surface which defines a swept volume as the first part moves;
  a second part mounted via one or more bearing surfaces so as to be rotatable about a pivot axis and including a second engagement surface, the second part being pivotally movable between:
  a locked condition, in which the second engagement surface is within a locking region of the swept volume for engagement with the first engagement surface to inhibit movement of the first part; and
  an unlocked condition, in which the second engagement surface is outside of the locking region of the swept volume,
  wherein the one or more bearing surfaces define an effective bearing radius which is greater than the distance between the centre of mass of the second part and the pivot axis.

Clause 2. A lock according to claim 1, wherein the second part bearing surface coefficient of friction is within the range 0.05 to 0.45.

Clause 3. A lock according to any preceding claim, including a biasing device arranged to bias the second part to remain in one or more of the locked condition and the unlocked condition.

Clause 4. A lock according to any preceding claim, wherein the second part defines a generally circular peripheral surface which extends around the pivot axis of the second part and which defines the second engagement surface.

5. A lock according to any preceding claim, wherein the first part includes a recessed surface which defines the first engagement surface.

Clause 6. A lock according to any preceding claim, wherein the second part includes a recessed surface which defines a passageway for movement of the first part when the second part is in the unlocked condition.

Clause 7. A lock according to claim 5 or 6, wherein the recessed surface of the first part and/or second part is generally arc shaped.

Clause 8. A lock according to claim 7, wherein the radius of a peripheral surface portion of the first part corresponds to the radius of the recessed surface of the second part and/or the radius of a peripheral surface portion of the second part corresponds to the radius of the recessed surface of the first part.

Clause 9. A lock according to any preceding claim, wherein the first and/or second engagement surface includes a ramped or stepped region opening onto the peripheral surface thereof.

Clause 10. A vehicle assembly including a lock according to any preceding claim.

Clause 11. A vehicle assembly according to claim 10, in which the vehicle assembly comprises an aircraft landing gear assembly.

Clause 12. A vehicle assembly according to claim 11, wherein the lock is a ground lock mechanically coupled to the landing gear assembly, the assembly including an actuation device arranged for mechanical operation by a user from a location on the ground.

Clause 13. A vehicle assembly according to claim 12, wherein the actuation device includes and is operable by a mechanical input device arranged to be within the reach of an average human stood at an operating location on the ground when the landing gear assembly is in the deployed condition.

Clause 14. A vehicle assembly according to any of claim 12 and 13, including a biasing device arranged to bias the actuation device to a unlocked condition corresponding to the second part being in the unlocked condition, and further including a lock element arranged to be engagable with the landing gear assembly to maintain the actuation device in a locked condition corresponding to the second part being in the locked condition.

Clause 15. A vehicle assembly according to claim 14 including an indicator element arranged to provide a visible indication that the ground lock is in the locked condition.

Clause 16. An aircraft landing gear assembly movable between a deployed condition, in which the landing gear assembly is arranged to support an aircraft on the ground, and a retracted condition for flight, the landing gear assembly including a ground lock comprising:
a movably mounted first part defining a first engagement surface which defines a swept volume as the first part moves; and
a movably mounted second part defining a second engagement surface, the second part being movable between:
a locked condition, in which the second engagement surface is within a locking region of the swept volume for engagement with the first engagement surface to inhibit movement of the first part; and
an unlocked condition, in which the second engagement surface is outside of the locking region of the swept volume, the ground lock including an actuation device arranged to enable mechanical operation of the ground lock by a user from an operating location on the ground when the landing gear assembly is in the deployed condition.

Clause 17. An aircraft landing gear assembly according to claim 16, wherein the actuation device includes and is operable by a mechanical input device arranged to be within the reach of an average human stood on at an adjacent location on the ground when the landing gear assembly is in the deployed condition.

Clause 18. An aircraft landing gear according to and of claims 16 and 17, including a biasing device arranged to bias the actuation device to a unlocked condition corresponding to the second part being in the unlocked condition, and further including a lock element arranged to be engagable with the landing gear assembly to maintain the actuation device in a locked condition corresponding to the second part being in the locked condition.

Clause 19. An aircraft landing gear assembly according to any of claims 16 to 18, including an indicator element.

Clause 20. An aircraft landing gear assembly according to claim 19, wherein the indicator element is coupled to the second part substantially outside of the load path between the actuation device and the second part.

Clause 21. An aircraft landing gear assembly according to any preceding claim, wherein the second part is mounted via one or more bearing surfaces so as to be rotatable about a pivot axis and the one or more bearing surfaces define an effective bearing radius which is greater than the distance between the centre of mass of the second part and the pivot axis.

Clause 22. An aircraft landing gear assembly according to any preceding claim arranged such that with the second part in the unlocked condition the second engagement surface is outside of the swept volume and optionally wherein the second part bearing surface coefficient of friction is within the range 0.05 to 0.45.

Clause 23. An aircraft landing gear assembly according to any preceding claim, including a biasing device arranged to bias the second part to remain in one or more of the locked condition and the unlocked condition.

Clause 24. An aircraft landing gear assembly according to any preceding claim, wherein the second part defines a generally circular peripheral surface which extends around the pivot axis of the second part and which defines the second engagement surface.

Clause 25. An aircraft landing gear assembly according to any preceding claim, wherein the first part includes a recessed surface which defines the first engagement surface.

Clause 26. An aircraft landing gear assembly according to any preceding claim, wherein the second part includes a recessed surface which defines a passageway for movement of the first part when the second part is in the unlocked condition.

Clause 27. An aircraft landing gear assembly according to any of claims 25 and 26, wherein the recessed surface of the first part and/or second part is generally arc shaped.

Clause 28. An aircraft landing gear assembly according to claim 27, wherein the radius of a peripheral surface portion of the first part corresponds to the radius of the recessed surface of the second part and/or the radius of a peripheral surface portion of the second part corresponds to the radius of the recessed surface of the first part.

Clause 29. An aircraft landing gear assembly according to any preceding claim, wherein the first and/or second engagement surface includes a ramped or stepped region opening onto the peripheral surface thereof.

Clause 30. A vehicle assembly comprising:
a pivotally mounted first part including a first engagement surface which defines a swept volume as the first part moves;
a pivotally mounted second part including a second engagement surface, the second part being movable between:
a locked condition, in which the second engagement surface is within a locking region of the swept volume for engagement with the first engagement surface to inhibit movement of the first part; and
an unlocked condition, in which the second engagement surface is outside of the locking region of the swept volume; and
a lug,
the second part being configured to be inserted into and mounted within the lug.

Clause 31. A vehicle assembly according to claim 30 arranged such that with the second part in the unlocked condition the second engagement surface is outside of the swept volume.

Clause 32. A vehicle assembly according to any of claims 30 and 31 including a biasing device arranged to bias the second part to remain in one or more of the locked condition and the unlocked condition.

Clause 33. A vehicle assembly according to any of claims 30 to 32 wherein the second part defines a generally circular major peripheral surface which extends around the pivot axis of the second part and which defines the second engagement surface.

Clause 34. A vehicle assembly according to any of claims 30 to 33, wherein the first part includes a recessed surface which defines the first engagement surface.

Clause 35. A vehicle assembly according to any of claims 30 to 34, wherein the second part includes a recessed surface which defines a passageway for movement of the first part when the second part is in the unlocked condition.

Clause 36. A vehicle assembly according to any of claims 30 to 36, wherein the recessed surface of the first part and/or second part is generally arc shaped.

Clause 37. A vehicle assembly according to claim 36, wherein the radius of a peripheral surface portion of the first part corresponds to the radius of the recessed surface of the second part and/or the radius of a peripheral surface portion of the second part corresponds to the radius of the recessed surface of the first part.

Clause 38. A vehicle assembly according to any of claims 30 to 37, wherein the first and/or second engagement surface includes a ramped or stepped region opening onto the peripheral surface thereof.

Clause 39. A lock, vehicle assembly and/or an aircraft landing gear assembly substantially as herein described with reference to the accompanying drawings.

The invention claimed is:

1. An aircraft landing gear assembly comprising:
a pivotally mounted first part including a first engagement surface which defines a swept volume as the first part moves;
a pivotally mounted second part including a second engagement surface, the second part being movable between:
a locked condition, in which the second engagement surface is within a locking region of the swept volume for engagement with the first engagement surface to inhibit movement of the first part; and
an unlocked condition, in which the second engagement surface is outside of the locking region of the swept volume; and
a member comprising a pair of lugs disposed in a parallel relationship with a space between them, each lug defining a hole, the holes being coaxially aligned;
wherein the second part includes first and second bearing portions with a locking portion between them, the locking portion defining the second engagement surface, the second part being configured to be inserted into and mounted within the lug holes with the first bearing portion rotatable within a first one of the pair of lugs, the second bearing portion rotatable within a second one of the pair of lugs and the locking portion being disposed in the space between the lugs, wherein the locking portion has a first maximum radius not greater than a second maximum radius of at least one of the first and second bearing portions.

2. The aircraft landing gear assembly according to claim 1, arranged such that with the second part in the unlocked condition the second engagement surface is outside of the swept volume.

3. The aircraft landing gear assembly according to claim 1, including a biasing device arranged to bias the second part to remain in one or more of the locked condition and the unlocked condition.

4. The aircraft landing gear assembly according to claim 1, wherein the second part defines a generally circular major peripheral surface which extends around the pivot axis of the second part and which defines the second engagement surface.

5. The aircraft landing gear assembly according to claim 1, wherein the first part includes a recessed surface which defines the first engagement surface.

6. The aircraft landing gear assembly according to claim 1, wherein the second part includes a recessed surface which defines a passageway for movement of the first part when the second part is in the unlocked condition.

7. The aircraft landing gear assembly according to claim 1, wherein the first and/or second engagement surface includes a ramped or stepped region opening onto the peripheral surface thereof.

8. The aircraft landing gear assembly according to claim 1, wherein a majority of the locking portion has the first maximum radius and a majority of the first bearing portion has the second maximum radius.

9. The aircraft landing gear assembly according to claim 1, wherein the recessed surface of the first part and/or second part is generally arc shaped.

10. The aircraft landing gear assembly according to claim 9, wherein the radius of a peripheral surface portion of the first part corresponds to the radius of the recessed surface of the second part and/or the radius of a peripheral surface portion of the second part corresponds to the radius of the recessed surface of the first part.

11. The aircraft landing gear assembly according to claim 1, wherein the first maximum radius of the locking portion is not greater than the second maximum radius of the first bearing portion and the first maximum radius of the the locking portion is greater than a third maximum radius of the second bearing portion.

12. The aircraft landing gear assembly according to claim 11, wherein the first maximum radius of the locking portion is equal to the second maximum radius of the first bearing portion.

13. An aircraft landing gear assembly according to claim 11, wherein a majority of the locking portion has the first maximum radius, a majority of the first bearing portion has the second maximum radius and a majority of the second bearing portion has the third maximum radius.

* * * * *